Figure 1:
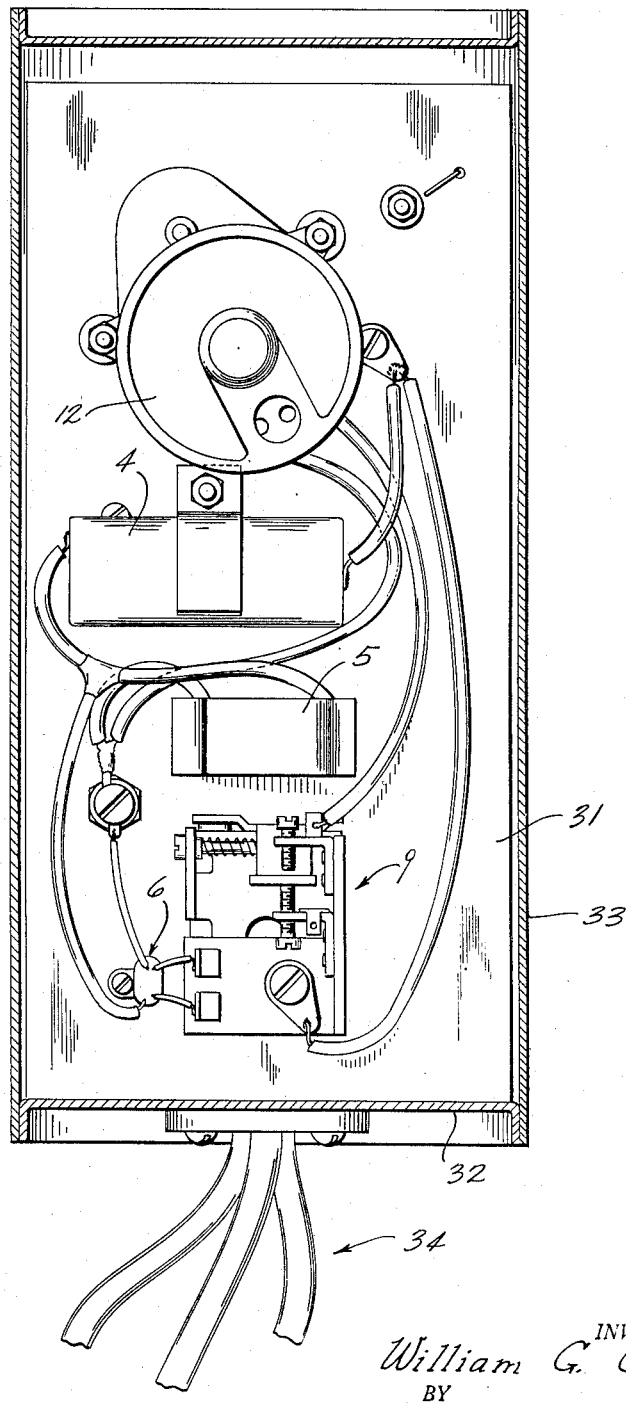

Jan. 4, 1955  W. G. COE  2,698,888
CONTROL SYSTEM AND RECEIVER THEREFOR
Filed Nov. 4, 1949  3 Sheets-Sheet 1

INVENTOR.
William G. Coe
BY
Austin R. Woolfolk
Attorney

Jan. 4, 1955 W. G. COE 2,698,888
CONTROL SYSTEM AND RECEIVER THEREFOR
Filed Nov. 4, 1949 3 Sheets-Sheet 2

INVENTOR.
William G. Coe
BY
Andrew R. Woolfolk
Attorney

Jan. 4, 1955   W. G. COE   2,698,888
CONTROL SYSTEM AND RECEIVER THEREFOR
Filed Nov. 4, 1949   3 Sheets-Sheet 3

INVENTOR.
William G. Coe
BY
Arthur R. Woolfolk
Attorney

United States Patent Office 2,698,888
Patented Jan. 4, 1955

2,698,888

CONTROL SYSTEM AND RECEIVER THEREFOR

William G. Coe, East Stroudsburg, Pa., assignor to McGraw Electric Co., Milwaukee, Wis., a corporation of Delaware Application November 4, 1949, Serial No. 125,588

1 Claim. (Cl. 200—92)

This invention relates to a control system and to the apparatus therefor.

In greater detail, this invention relates to a system which provides for the remote control by carrier current of a predetermined frequency superimposed on power lines and controlling the energization of any desired type of apparatus operated by electric power, such as motors, power relays, switches, lamps, heaters, or any other electrically operated apparatus.

Objects of this invention are to provide a system and apparatus which allows the remote control of a single or a plurality of electrically operated devices when a selected frequency is superimposed on the power line and is maintained for certain selected time intervals.

A primary purpose of this invention is to provide a series of receivers which are so arranged in the system that all of the receivers are put into the same position at the first signal that is sent out from the control station, so that if, for instance, certain of the receivers are in the "on" position and other receivers are in the "off" position, that when an "on" signal is sent from the control station, all of the receivers will be put in the "on" position if not already so, or, on the other hand, are so arranged that all of the receivers will be put in the "off" position if not already so when an "off" signal is sent from the control station.

A further primary object of this invention is to provide a receiver which is controlled by carrier current of a predetermined frequency and which has a self-starting, synchronous motor operating through suitable mechanism including a magnetic clutch for driving a cam or similar member with the clutch arranged to remain normally open and to be closed magnetically when power is supplied to the motor, and to so associate this motor and clutch mechanism with the cam that an externally applied bias will bring the cam back to its initial zero position, the biasing means serving to rotate the cam without rotating the motor.

A further object of this invention is to provide a system and means which are not disturbed by static or similar short or transient impulses, but which respond to the carrier current when the carrier current is maintained for predetermined selected intervals of time, the "on" and "off" positions of the apparatus being obtained by selecting the particular period of time during which the carrier current remains on.

An embodiment of the invention is shown in the accompanying drawings, in which:

Figure 1 is a vertical, sectional view through one of the receivers.

Figures 2, 3, 4, and 5 show portions of the receiver in different successive positions, certain of which are only temporarily occupied as will be apparent as the description proceeds.

Figure 6:
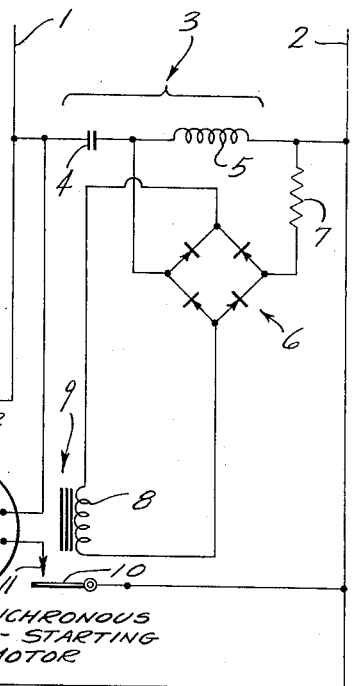
Figure 6:
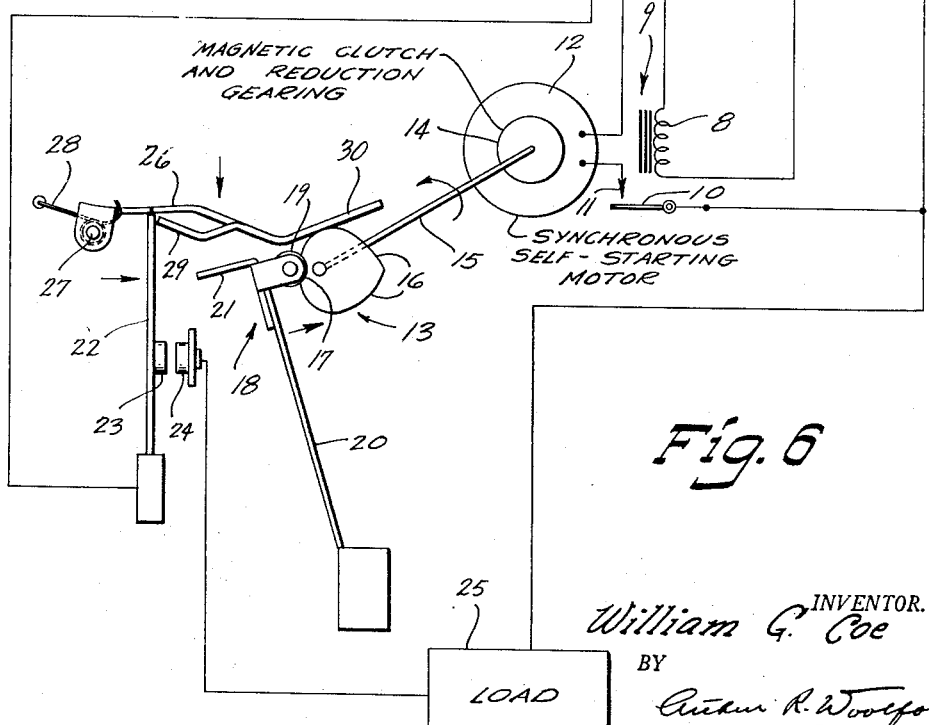

Figure 6 is a diagrammatic view showing the receiving system and a portion of one of the receivers.

Referring to Figure 6, it will be seen that the power lines or supply mains have been indicated by the reference characters 1 and 2. An electric filter indicated by the reference character 3 is connected between the mains and may consist of a blocking condenser 4 and an inductance 5. Opposite sides of the inductance 5 are connected to the input terminals of a full wave rectifier which may be a bridge type of dry rectifier and is indicated generally by the reference character 6 and preferably a current limiting resistor 7 is interposed in this circuit.

The rectified current is fed from the rectifier 6 to the coil 8 of a sensitive relay indicated generally by the reference character 9. This relay is provided with an armature 10 which may be connected to the main 2 and with a stationary contact 11 connected to one of the terminals of the self-starting synchronous motor 12, the other terminal of such motor being connected to the main 1.

The motor 12 drives an approximately heart-shaped cam indicated generally by the reference character 13. The motor 12 does not drive the cam directly but drives the cam through a mechanism which includes a reduction mechanism and a normally open magnetically controlled clutch 14. The clutch and motor are of well known construction and are so arranged that the clutch remains open when no power is supplied the motor and is magnetically closed when power is supplied the motor, so that the cam 13 and its shaft 15 may be rotated to zero position by an externally applied bias, hereinafter described, without rotating the motor.

The heart-shaped cam 13 is provided with symmetrically arranged cam faces 16 and with a recess or zero position notch 17. The recess or notch 17 is shown most clearly in Figures 3, 4, and 5.

Figure 4:
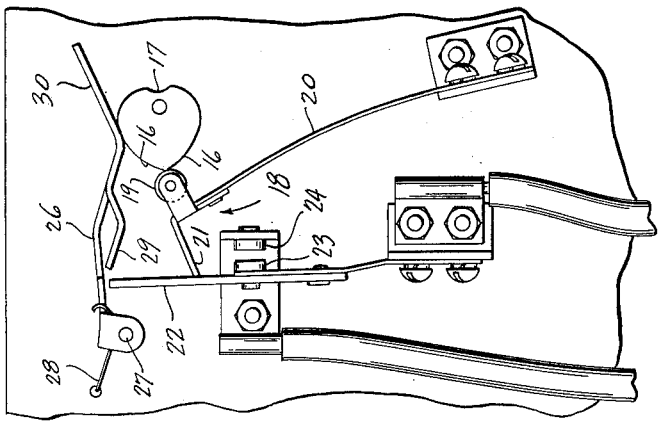

The cam 13 drives a cam follower indicated generally by the reference character 18 which consists of a small roller 19 riding directly on the cam and carried by a relatively heavy leaf spring member 20. The cam follower is also provided with an operating finger or tongue 21 which is adapted to engage the movable switch arm 22 when the receiver is operated to open the switch as shown in Figure 4 and hereinafter described. It is to be noted at this point that the movable switch arm 22 is biased towards switch closed position and is provided with a movable contact 23 which is arranged to engage the stationary contact 24 when the switch is closed. The movable switch arm 22 is connected to the line 1 and the stationary contact 24 is connected through the load 25 to the line 2, so that when the switch is closed the load is energized. As stated, this load may be any device operated by electric power.

Figure 5:
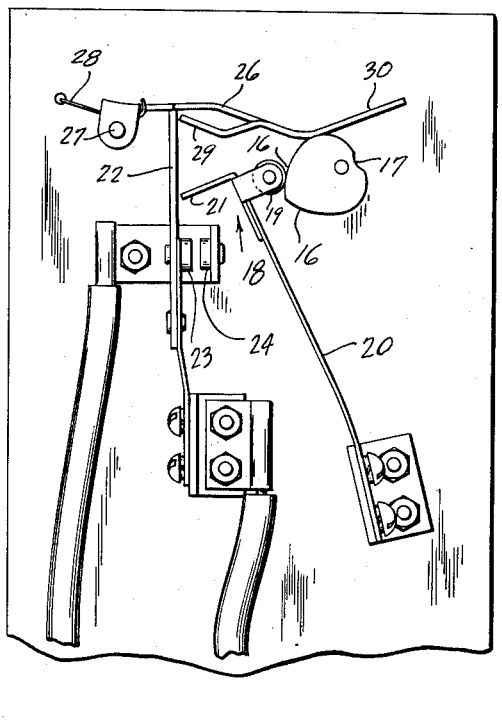

A latch lever 26 is pivotally supported as indicated at 27 and is urged downwardly as viewed in Figure 6 by means of the spring 28. This latch lever is so arranged that it has a latching tongue 29 which is adapted to latch the biased movable switch arm 22 in switch open position under certain conditions, for example as shown in Figures 2, 5, and 6 and to release the movable switch arm when the latching lever is raised by means of the cam 13 which cam operates upon the slanting cam follower portion 30 of the latch lever.

Figure 2:
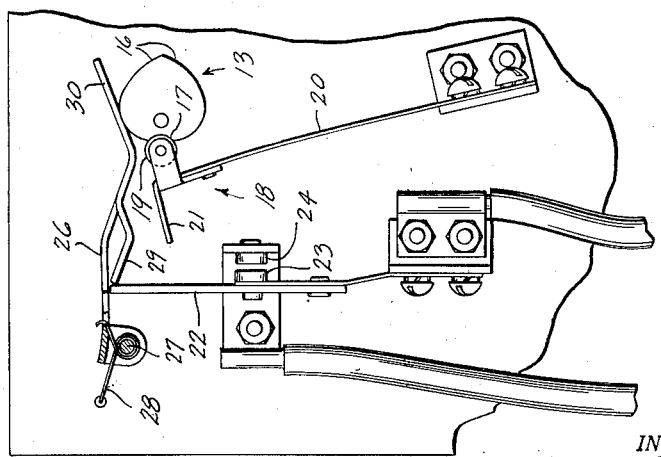

Figures 2 and 6 show the several parts in their zero position, or in their initial or starting position, which for the sake of simplicity, will hereinafter be referred to as the zero position. In this position, the cam 13 is temporarily and yieldingly held against motion by the seating of the roller 19 in the notch or recess 17. All portions of the cam faces 16 of the cam 13 are so arranged that the pressure of the roller 19 against either cam face 16 tends to rotate the cam to zero position, either by rotating it backwards against the direction of rotation imparted to it by the motor, as indicated by the curved arrow in Figure 6, or by completing its forward rotation.

Figure 3:
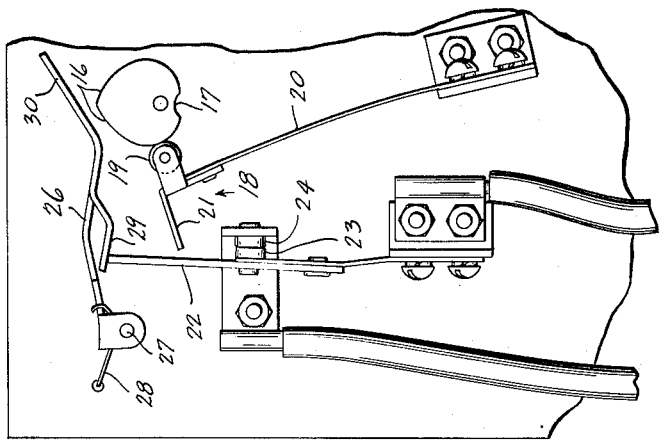

Assume that the switch is open and the cam is in its zero position as shown in Figures 2 and 6. If it is desired to close the switch, an impulse is sent out on the power lines or mains 1 and 2 by transmitting the carrier current thereto for a given length of time, for example, twenty seconds. Under these conditions, the cam 13 will be rotated from the position shown in Figure 2 to the position shown in Figure 3 and, during this partial rotation, will lift the latch lever 26 and free the movable switch arm 22 and allow the switch to close as shown in Figure 3. It is to be noted in Figure 3 that after the cam has raised the switch lever 26 to free the switch arm 22, that the switch arm rides below the tapered or slanting under side of the latching tongue 29 of the latch lever and raises the latch lever 26 beyond the point that it was raised by the cam 13, thus insuring a complete freeing of the movable switch arm 22 from the latching tongue 29 and allowing the switch to snap closed. The pressure of the roller 19 of the cam follower on the cam face rotates the cam back to zero position in a reverse direction to that imparted to it by the motor. This operation occurs after power, which is supplied the motor, has been cut off and, therefore, when the magnetic clutch has opened.

It is to be noted at this point that when a "switch closed signal" is sent out, as hereinabove described, that all of the receivers will be brought to switch closed position if not already in such position. All of the receivers that are in switch closed position from any cause whatsoever will remain in such position and all of the receivers which were initially in switch open position will be moved to switch closed position as described in detail hereinabove.

On the other hand, if it is desired to open the switches of the several receivers the operator at the control station sends out a "switch open signal." This signal consists in supplying the carrier current to the line wires for a longer period than the short opening period hereinbefore described. For example, this longer period may consist of forty seconds. It is sufficiently long so that the cam 13 rotates past the position shown in Figure 4 where it will be seen that the operating finger 21 of the cam follower moves the movable switch arm 22 to switch open position. As a matter of fact, the cam 13 rotates to the position shown in Figure 5 during this long "switch open signal." In this position the movable switch arm 22 is held open and the latch lever 26 is allowed to drop downwardly into latching position as shown in Figure 5 and thus lock the switch in open position. The pressure of the cam follower roller 19 against the corresponding cam face 16 completes the rotation of the cam in the same direction as that imparted to it by the motor when power supplied to the motor ceases, so that the cam rotates back to its zero position, as shown in Figures 2 and 6. On the other hand, when the cam has moved only to the position shown in Figure 3 corresponding to a "switch close signal," the cam 13 is rotated in a reverse direction back to its zero position by the pressure of the cam follower roller 19 against the corresponding cam face 16.

In each of the operations of returning the cam, whether in the same or in the reverse direction of that imparted to it by the motor, it is to be noted that the externally applied bias of the cam follower does not have to be sufficient to rotate the motor as the magnetically controlled clutch is open when the motor is not energized and consequently the externally applied bias may freely rotate the cam back to its zero position.

From the preceding description of the operation of the device, it is apparent that a static disturbance will not cause operation of the switch. The duration of the static disturbance is usually measurable in micro-seconds, whereas the duration of even the short signal is measured in seconds. Another point to be noted is that the rotation of the cam for either switch open or switch closed operation is, in each instance, more than sufficient to complete such operation. In other words, there is a margin of safety allowed in each of these time intervals which is ample to insure such operation.

The device may be mounted in any desired manner. A convenient way of mounting the receiver is upon an insulating support or partition 31 as shown in Figure 1. This insulating support may be carried by a base member 32 of metal supported in any suitable manner not shown. The base 32 may removably carry a tightly fitting can or housing 33 which may be of metal if so desired. Also, if it is desired, the partition 31 of insulating material may be secured to the base 32 in any suitable manner, not shown, or may merely rest upon the base 32 without being attached thereto. It is apparent that the heavy incoming leads indicated generally by the reference character 34 will furnish an adequate support for the partition 31 in themselves and the circular can or housing 33 will prevent the partition 31 from moving out of place. All of these features, however, are minor and form no portion of the invention. It is also preferable from a comparison of Figure 1 and Figures 2 through 5 that the self-starting synchronous motor 12, the condenser 4, inductance 5, sensitive relay 9, and rectifier 6 may be mounted on one side of the partition and the cam 13, latching lever 26, cam follower 18, and switch may be mounted on the other side of the partition 31. This is a convenient and simple way of arranging the apparatus.

While it is preferable to use a self-starting, synchronous motor, it is obvious that other types of constant speed motors could be employed if occasion demands.

It will be seen that a relatively simple, easily produced receiver has been provided by this invention and that a relatively simple system has also been provided, whereby a load of any type can be controlled remotely with assurance that all of the receivers, if a plurality of them are employed, are immediately put into the same condition when the first signal of either type is sent out from the control station. Further, from the disclosure hereinabove given, it is apparent that the apparatus and system are substantially free from static disturbance.

Although this invention has been described in considerable detail, it is to be understood that such description is intended as illustrative rather than limiting, as the invention may be variously embodied and is to be interpreted as claimed.

I claim:

A remote controlled electric switch comprising a motor, switch means including a movable switch member and a latch member engageable with said switch member to hold said switch member at one position, switch operating means including a cam driven from said motor, and a normally open clutch interposed between said motor and cam and arranged to be magnetically closed when said motor is energized, said switch operating means having a biased cam follower engaging said cam, said cam also engaging said latch and being movable in a given direction to operate said latch out of holding engagement with said switch member whereby said switch member is moved to a second position, further movement of said cam in said given direction moving said cam follower into engagement with said movable switch member to move said switch member to said one position, said biased cam follower being operatively biased toward said cam and effective upon said cam to return said cam to an initial position when the motor is de-energized and said clutch is open.

References Cited in the file of this patent

UNITED STATES PATENTS

| 987,698 | Cheney | Mar. 28, 1911 |
| 1,483,433 | Hall | Feb. 12, 1924 |
| 1,559,525 | Murphy et al. | Oct. 27, 1925 |
| 1,575,010 | Scheer | Mar. 2, 1926 |
| 1,696,582 | Rankin | Dec. 25, 1928 |
| 1,735,706 | Wood | Nov. 12, 1929 |
| 1,941,377 | Woodworth | Dec. 26, 1933 |
| 1,949,590 | Trogner | Mar. 6, 1934 |
| 2,101,269 | Pudelko | Dec. 7, 1937 |
| 2,103,907 | Kearsley | Dec. 28, 1937 |
| 2,180,948 | Bassett | Nov. 21, 1939 |
| 2,231,174 | Trogner | Feb. 11, 1941 |
| 2,282,007 | Smith | May 5, 1942 |
| 2,325,860 | Kizaur | Aug. 3, 1943 |
| 2,419,307 | Zottu | Apr. 22, 1947 |
| 2,443,452 | Hall | June 15, 1948 |
| 2,500,939 | Exner | Mar. 21, 1950 |
| 2,500,956 | Mershon | Mar. 21, 1950 |

FOREIGN PATENTS

| 212,601 | Great Britain | Mar. 10, 1924 |
| 359,733 | Germany | Sept. 26, 1922 |
| 558,726 | Germany | Sept. 10, 1932 |